Figure 1:
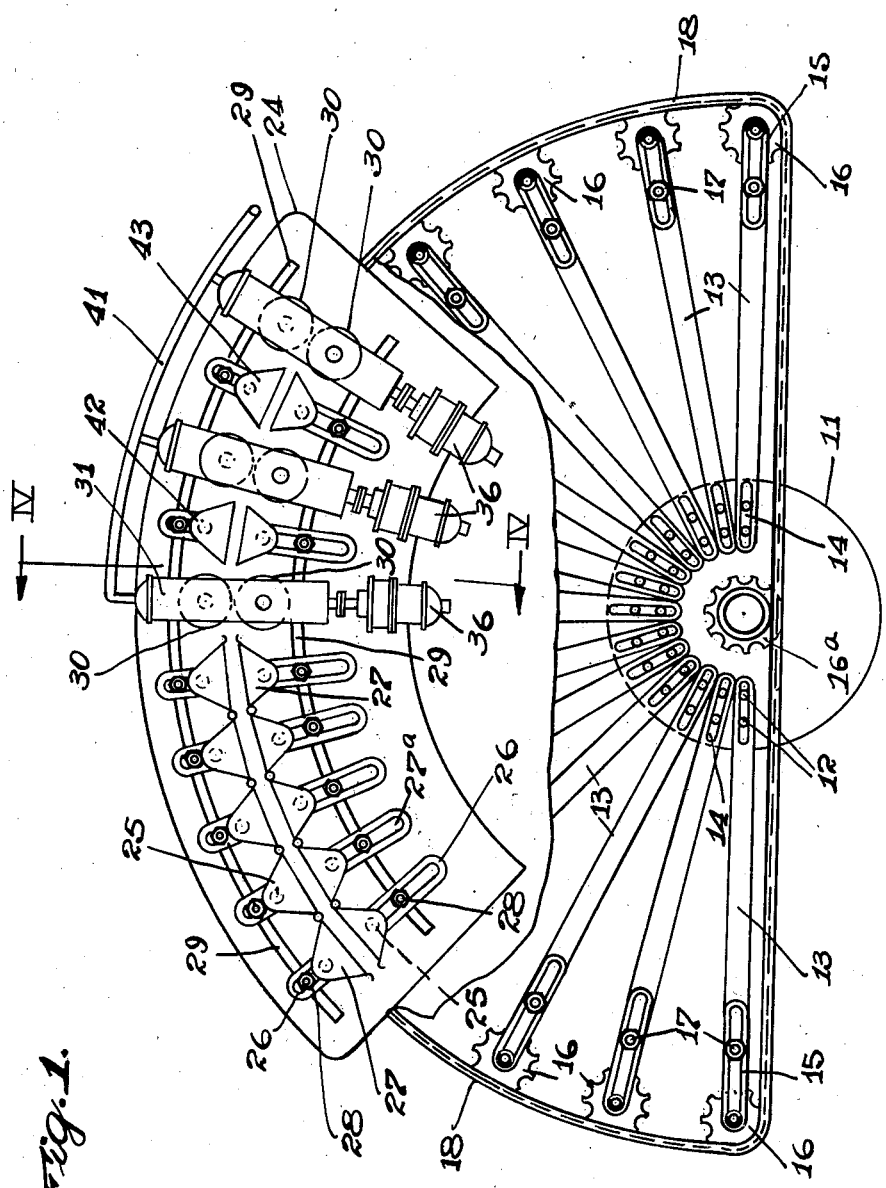

May 28, 1940.  W. OWEN  2,202,670
APPARATUS FOR PRESSING CURVED SAFETY GLASS
Filed July 13, 1938  4 Sheets-Sheet 1

INVENTOR.
WILLIAM OWEN
BY Bradley & Bee
ATTORNEYS.

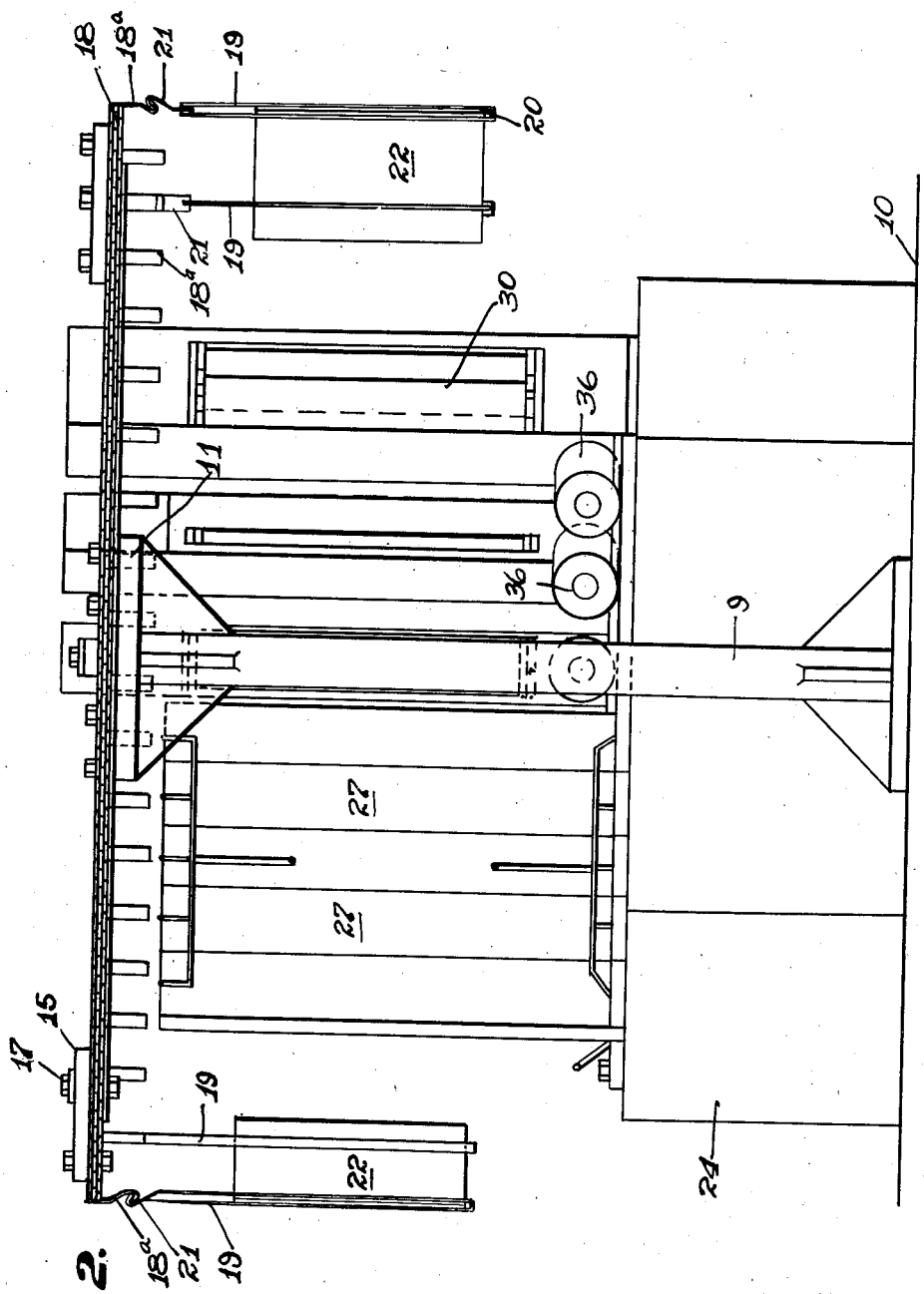

May 28, 1940.  W. OWEN  2,202,670
APPARATUS FOR PRESSING CURVED SAFETY GLASS
Filed July 13, 1938    4 Sheets-Sheet 3
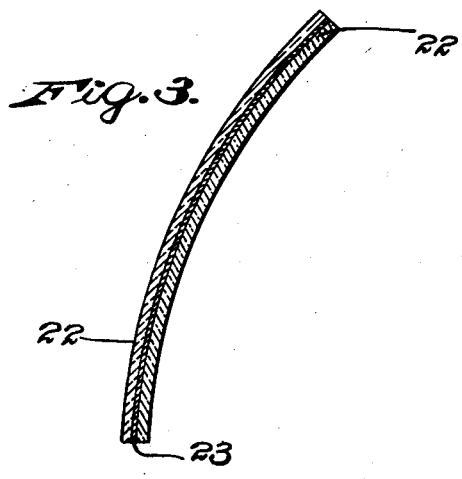
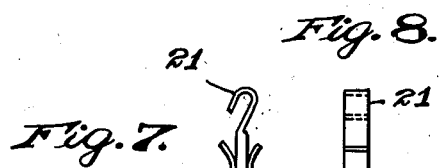
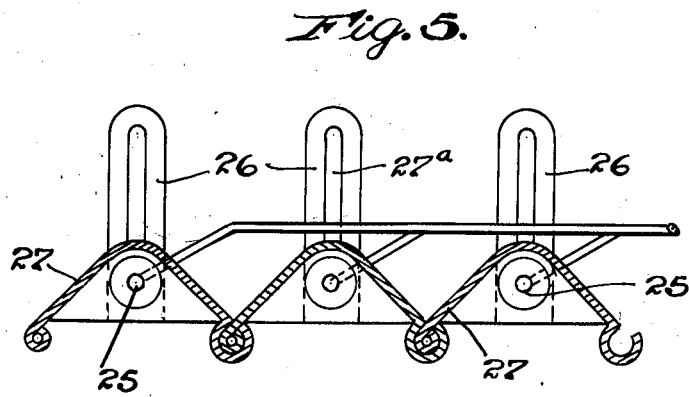
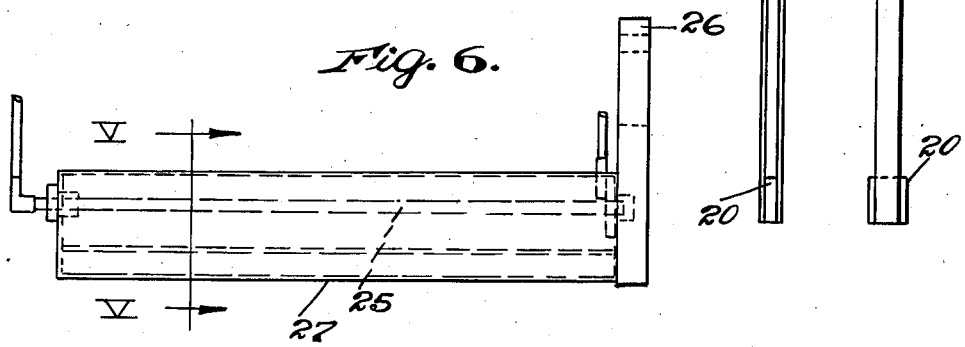
INVENTOR.
WILLIAM OWEN
BY Bradley & Bee
ATTORNEYS.

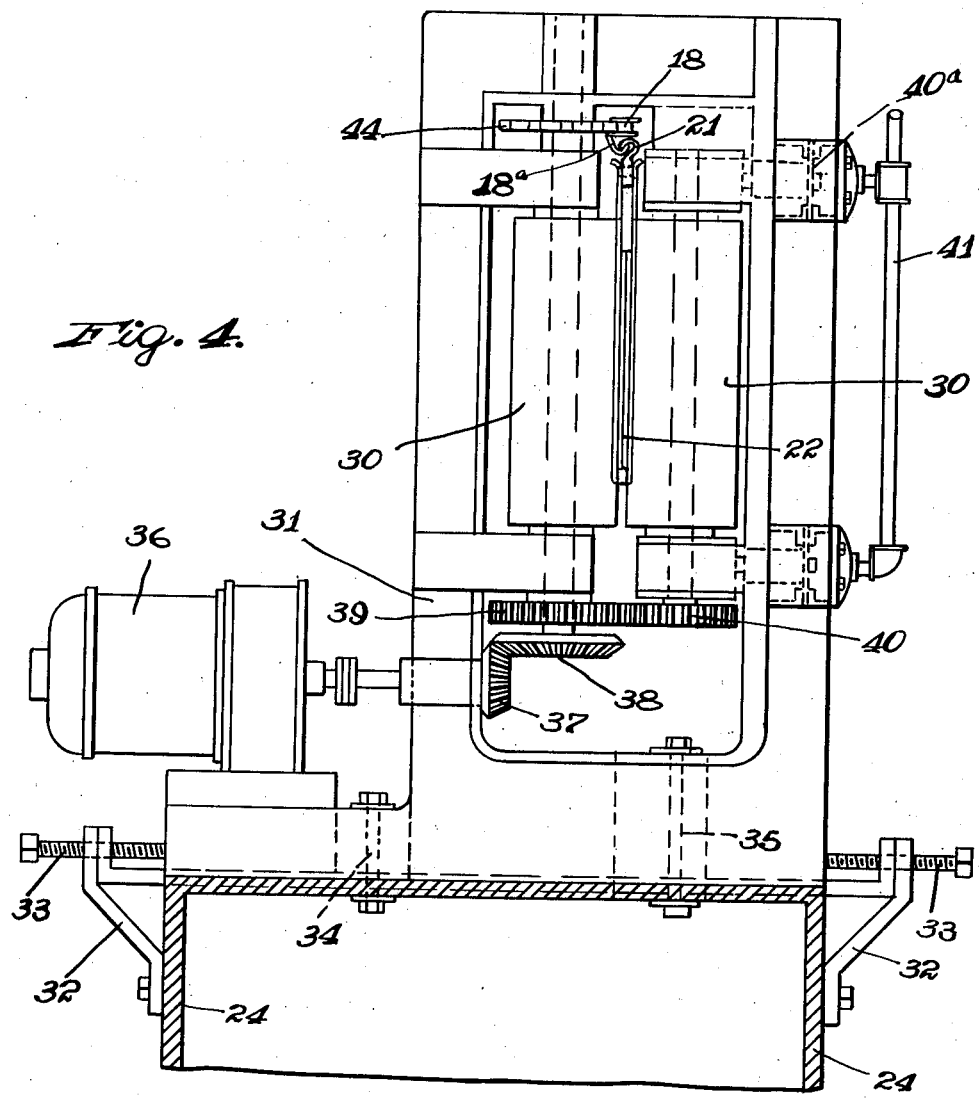

Patented May 28, 1940

2,202,670

UNITED STATES PATENT OFFICE 2,202,670

APPARATUS FOR PRESSING CURVED SAFETY GLASS

William Owen, Pittsburgh, Pa., assignor to Pittsburgh Plate Glass Company, Allegheny County, Pa., a corporation of Pennsylvania Application July 13, 1938, Serial No. 218,996

6 Claims. (Cl. 18—17)

The invention relates to apparatus for pressing curved safety glass which ordinarily consists of two curved sheets of glass with an interposed layer of cellulose plastic or a layer of synthetic resin, such as vinyl acetal. In laminating the assembly of glass sheets and plastic by the hydraulic method, it is first necessary to preliminarily adhere the sheets together under heat and pressure, so as to prevent the penetration of the pressing liquid between the sheets in the subsequent final pressing in an autoclave. The present invention relates to an improved apparatus for accomplishing the preliminary pressing by the use of the so-called nipper rolls, between pairs of which the assemblies are passed after being heated.

One object of the invention is the provision of a compact simple apparatus for accomplishing the function above stated with a minimum of labor and attention on the part of the operator and without danger of breakage of the glass or slippage of the layers of the assembly in the laminating operation. A further object of the invention is the provision of an apparatus which is subject to convenient adjustment through a wide range to take care of the lamination of plates of different curvatures. Certain embodiments of the invention are illustrated in the accompanying drawings, wherein:

Figure 1 is a plan view partially broken away of the apparatus. Fig. 2 is a rear elevation. Fig. 3 is a sectional view of the curved glass assembly, which is laminated in the apparatus. Fig. 4 is a section on an enlarged scale on the line IV—IV of Fig. 1. Figs. 5 and 6 are detail views showing the heating device, Fig. 5 being a section on the line V—V of Fig. 6, and Fig. 6 being a side elevation. And Figs. 7 and 8 are detail views of one of the hangers employed in supporting the assembly, Fig. 7 being an edge elevation and Fig. 8 a side elevation.

Referring to the drawings, 9 is an upright post securely anchored to the floor 10 and provided at its upper end with an integral bracket 11. The bracket 11 has a horizontal plate at its upper end provided with sets of perforations 12 to receive bolts for anchoring the radial arms 13. These arms rest upon the bracket 11 and are slotted, as indicated at 14, to permit of the radial adjustment of the arms, suitable bolts extending through the slots and through the plate at the top of the bracket for clamping the parts in position. Mounted upon the outer end of each of the arms 13 is a bracket 15 carrying a sprocket 16, the brackets being slotted, as shown in Fig. 1, and secured to the arms by means of the bolts 17, thus providing for additional radial adjustment of the sprockets. An endless chain 18 passes around such sprockets and also over the idler take-up sprocket 16a on the bracket 11, such chain being provided with a plurality of depending hooks 18a for releasably supporting the hangers in which the assemblies to be laminated are carried. These hangers are in the form of loops 19 preferably of strips of sheet metal provided at their lower ends with blocks 20, preferably of soft rubber vulcanized to such ends, and having the hooks 21 at their upper ends, such hooks being releasably engaged with the hooks 18a carried by the chain.

The assembly to be laminated comprises a pair of sheets of glass 22 (Fig. 3) with an interposed layer 23 of plastic material, such as vinyl acetal resin, cellulose acetate, or cellulose nitrate. In the case of the vinyl acetal, no cement is required, the resin adhering to the glass under heat and pressure, but in the case of ordinary plastic, such as cellulose acetate, a suitable cement is required in order to secure a bond under the heating and pressing operation, as later described. The assembly as shown in Fig. 3 is ordinarily supported by two of the hangers 19, as indicated in Fig. 2, but a greater number may be employed, if desired, depending upon the size of the assembly. In accomplishing the pressing operation, as more fully described later, the assemblies supported in the hangers are first carried past heating elements, which soften the resin or the adhesive used therewith, after which the hangers are carried between presser rolls to apply the necessary pressure.

Mounted in opposition to the post beneath the line of travel of the chain is a suitable stand 24, preferably in the form of a casting, which is seated upon the floor 10, and if desired, may be anchored thereto. This stand supports a series of pairs of heating devices arranged on opposite sides of the line of travel of the hangers carrying the assemblies to be laminated. These heating devices comprise vertical resistance elements 25, which are electrically heated. Each of the elements is suitably supported upon a bracket 26 (Fig. 6) which also carries a parabolic reflector 27 in order to increase the heating effect of the resistance elements upon the assemblies passing therebetween. The brackets 26 which carry the units are slotted, as indicated at 27a and are secured in position by means of bolts 28 extending through the slots and through slots 29 in the base or stand 24. This arrangement provides for a radial adjustment of the position of the heating elements with respect to the post 9. This radial adjustment of the heating elements and also of the arms 13, as heretofore explained, is to adapt the apparatus for handling assemblies of different curvatures.

After the assemblies pass the first five heating elements, as shown in Fig. 1, they are carried between a series of three pressing units. These pressing units are in the form of pairs of vertical rolls 30, 30 journalled in the frame member 31 and this frame member 31 is mounted for radial adjustment on the stand 24, as indicated in Fig. 4. The stand 24 carries a pair of brackets 32, 32, in which are mounted the screws 33, 33 engaging the opposite ends of the frame member. The frame member is anchored to the stand 24 by means of the bolts 34, 35, which extend through slots in the frame members, so that when these bolts are loosened, the frame member may be adjusted transversely of the stand by the screws 33, 33. The frame member also carries the motor 36 for driving the rolls 30, 30, this drive being accomplished by means of the bevel gears 37 and 38, which drive the left hand roll 30 (Fig. 4), the other roll 30 being driven by means of the spur gears 39 and 40 keyed to the ends of the roll shafts. In order to provide the necessary pressure upon the assemblies passing between the rolls, the right hand roll 30 (Fig. 4) is mounted in movable bearings in the frame member 31 and these bearings are pressed inward by means of the diaphragms 40a. These diaphragms are preferably operated by means of air pressure supplied through the pipe 41.

The three sets of nipper or presser rolls, as shown in Fig. 1, are all of the construction as just described, and as above indicated, may be adjusted radially with respect to the post to take care of the pressing of assemblies of different curvatures. As shown, two additional pairs of heating units 42 and 43 are provided intermediate the sets of nipper rolls (Fig. 1), but this is not an essential and in fact, in some cases, the pressing operation may be accomplished by a single pair of rolls. The motors 36 not only serve to drive the presser rolls, but also serve to drive the chain 18, this being accomplished by the use of sprockets 44 keyed to the shafts of the rolls 30, as indicated in Fig. 4, around which the chain 18 passes.

In operation, the motors 36 are driven so as to give the carrier chain 18 a movement in a clockwise direction and as the chain moves toward the first set of heaters 25 (Fig. 1), the assemblies of glass and resin, each carried by two sets of hangers 19 are hooked on the chain, after which the movement of the chain carries the assemblies between the heaters which heat the assemblies to the point where the resin or plastic which is used as an interlayer becomes adhesive. The assemblies then pass successively between the pairs of nipper rolls 30 where the sheets of glass are pressed tightly against the resin sheets, thus giving the preliminary adhesion necessary in order to prevent liquid penetration when the laminated assemblies are finally compressed into composite form in an autoclave. After the assemblies pass the last pair of presser rolls, the hangers carrying the assemblies are removed from the carrier chain, thus completing the operation. The presser rolls are preferably covered with yielding material, such as rubber, and the hangers 19 are relatively thin sheet metal, so that no difficulty is experienced in carrying the hangers between the presser rolls without injury to the glass due to the localized pressure thereon incident to the hangers passing between the rolls.

While the apparatus has its primary utility in laminating curved plates of glass, it will be understood that it may be used in laminating flat plates, in which case the carrier would be guided to move in a straight line instead of on a curve, and the heaters and presser rolls would be similarly located in a straight line.

What I claim is:

1. Apparatus for pressing safety glass assemblies comprising an overhead carrier, means guiding the carrier horizontally along a path corresponding to the contour of the glass sheets to be laminated, hangers suspended from the carrier and comprising loops of thin material for carrying the assemblies in vertical position, means along the line of travel of the hangers for heating the assemblies, a pair of vertical nipper rolls positioned so that the pass between the rolls lies in the line of travel of the hangers, and means for driving the carrier and the nipper rolls.

2. Apparatus for pressing curved safety glass assemblies comprising an overhead flexible carrier, means guiding the carrier horizontally along a curved path corresponding to the curvature of the glass sheets to be laminated, hangers suspended from the carrier and comprising loops of thin material for carrying the assemblies in vertical position, means along the line of travel of the hangers for heating the assemblies, a pair of vertical nipper rolls positioned so that the pass between the rolls lies in the line of travel of the hangers, and means for driving the carrier and the nipper rolls.

3. Apparatus for pressing curved safety glass assemblies comprising an overhead flexible carrier, horizontal guiding means supporting the carrier movable thereon and defining a curved path corresponding to the curvature of the glass sheets to be laminated, said means including adjusting mechanism to vary said curved path followed by the carrier, hangers suspended from the carrier and comprising loops of thin material for carrying the assemblies in vertical positions, means along the line of travel of the hangers for heating the assemblies mounted for adjustment transversely of such line of travel, a pair of nipper rolls positioned so that the pass between the rolls lies in the line of travel of the hangers and adjustable transversely of such line of travel, and means for driving the carrier and the nipper rolls.

4. Apparatus for pressing curved safety glass assemblies, comprising a vertical post, a series of arms supported at their inner ends on the post and extending radially therefrom, sprockets journalled in the outer ends of the arms, an endless horizontal chain carrier engaging the sprockets and in its movement thereover having a curved path corresponding to the curvature of the glass sheets to be laminated, hangers suspended from the carrier and comprising loops of thin material for carrying the assemblies in vertical position, means along the line of travel of the hangers for heating the assemblies, a pair of vertical nipper rolls positioned so that the pass between the rolls lies in the line of travel of the hangers, and means for driving the carrier and the nipper rolls.

5. Apparatus for pressing curved safety glass assemblies, comprising a vertical post, a series of arms supported at their inner ends on the post and extending radially therefrom, sprockets journailed in the outer ends of the arms, and adjustable radially with respect to the post, an endless horizontal chain carrier engaging the sprockets and in its movement thereover having a curved path corresponding to the curvature of the glass sheets to be laminated, hangers suspended from the carriers and comprising loops of thin material for carrying the assemblies in vertical position, means along the line of travel of the hangers for heating the assemblies, such means being mounted for adjustment toward and from such line, a pair of vertical nipper rolls positioned so that the pass between the rolls lies in the line of travel of the hangers, such rolls being mounted for adjustment transversely of such line, and means for driving the carrier and the nipper rolls.

6. In an apparatus for assembling sheets of a safety glass unit into laminated form, a driven overhead carrier, guiding means supporting and directing the carrier along a predetermined path, strips of material constituting sheet glass supports suspended from the carrier and normally disposed flat against the sheet glass unit to hold the latter edgewise in a substantially vertical plane along said predetermined path, means along said predetermined path to heat the safety glass unit, driven vertical rolls disposed on opposite sides of said predetermined path for receiving and compressing the safety glass unit therebetween in rolling relation.

WILLIAM OWEN.